(12) United States Patent
Guo et al.

(10) Patent No.: US 12,549,704 B2
(45) Date of Patent: Feb. 10, 2026

(54) DUAL VIEW DISPLAY

(71) Applicant: Ford Global Technologies, LLC, Dearborn, MI (US)

(72) Inventors: Biaohe Guo, Northville, MI (US); Mark Larry, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/731,506

(22) Filed: Jun. 3, 2024

(65) Prior Publication Data

US 2025/0373778 A1 Dec. 4, 2025

(51) Int. Cl.
*H04N 13/31* (2018.01)
*H04N 13/317* (2018.01)
*H04N 13/398* (2018.01)

(52) U.S. Cl.
CPC ........... *H04N 13/31* (2018.05); *H04N 13/317* (2018.05); *H04N 13/398* (2018.05)

(58) Field of Classification Search
CPC ..... H04N 13/31; H04N 13/317; H04N 13/398
USPC .......................................................... 348/51
See application file for complete search history.

(56) References Cited

U.S. PATENT DOCUMENTS

| | | | |
|---|---|---|---|
| 7,580,186 B2 * | 8/2009 | Mather | H04N 13/305 359/464 |
| 9,188,789 B2 * | 11/2015 | Suzuki | G09G 3/003 |
| 10,298,921 B1 * | 5/2019 | Frayne | G02B 30/27 |
| 11,106,083 B2 | 8/2021 | Woodgate et al. | |
| 12,272,323 B1 * | 4/2025 | Kim | G09G 3/3426 |
| 2005/0111100 A1 * | 5/2005 | Mather | H04N 13/359 359/464 |
| 2008/0106595 A1 * | 5/2008 | Yamane | B60K 35/00 348/59 |
| 2014/0293172 A1 * | 10/2014 | Suzuki | G02B 30/30 359/462 |
| 2015/0301343 A1 * | 10/2015 | Johnson | G02B 30/27 445/24 |
| 2016/0203751 A1 * | 7/2016 | Suginohara | G09G 3/2003 345/694 |
| 2016/0282542 A1 * | 9/2016 | Seo | G02B 30/30 |
| 2016/0379394 A1 * | 12/2016 | Kim | G02B 30/27 345/629 |
| 2020/0156471 A1 * | 5/2020 | Lee | B60K 35/81 |
| 2020/0174279 A1 * | 6/2020 | Ishihara | H04N 13/305 |
| 2020/0211507 A1 * | 7/2020 | Clarke | G02B 26/004 |
| 2020/0211508 A1 * | 7/2020 | Clarke | G07F 17/3241 |
| 2022/0197054 A1 * | 6/2022 | Park | G02B 30/36 |

(Continued)

FOREIGN PATENT DOCUMENTS

| CN | 114035339 A | 2/2022 |
|---|---|---|
| CN | 111965863 B | 7/2023 |

*Primary Examiner* — Tung T Vo
(74) *Attorney, Agent, or Firm* — Frank Lollo; Brooks Kushman P.C.

(57) ABSTRACT

A first image is generated at a first viewing angle during a first time by energizing a first LED zone to a first luminance. A second image is generated at a second viewing angle during a second time by energizing a second LED zone to a second luminance. The first luminance is directed at the first viewing angle by a first micro-lens disposed over the first LED zone and a parallax barrier. The second luminance is directed at a second viewing angle by a second micro-lens disposed over the second LED zone and the parallax barrier.

20 Claims, 8 Drawing Sheets

(56) References Cited

U.S. PATENT DOCUMENTS

| | | |
|---|---|---|
| 2022/0199588 A1 | 6/2022 | Ju et al. |
| 2022/0252899 A1* | 8/2022 | Wu .......................... G02B 5/02 |
| 2022/0337804 A1* | 10/2022 | Lin ........................ H04N 13/31 |
| 2023/0044063 A1* | 2/2023 | Peng ..................... G09G 3/2011 |
| 2023/0047322 A1* | 2/2023 | Bourgin .................. G02F 1/163 |
| 2023/0324729 A1* | 10/2023 | Woodgate ............ B60K 35/654 |
| 2023/0393413 A1* | 12/2023 | Huh .................. G02F 1/133526 |
| 2023/0412790 A1* | 12/2023 | Won ..................... H04N 13/349 |
| 2023/0421749 A1* | 12/2023 | Dudrenov ............ H04N 13/368 |
| 2024/0036352 A1* | 2/2024 | Hsu ........................ G02B 30/27 |

\* cited by examiner

DUAL VIEW DISPLAY

BACKGROUND

Systems that move and/or that have mobile components, including vehicles, robots, drones, cell phones etc., can be operated by acquiring and processing sensor data, including data regarding system status and data regarding an environment around the system. Computing devices included in a vehicle, for example, can format and output the data to display devices for vehicle occupants to view and interact with. A vehicle display device can display a wide variety of data including, but not limited to, vehicle control screens that control vehicle systems such a climate control and vehicle propulsion, vehicle status data such as vehicle speed, energy usage, vehicle service notices, data regarding the environment around the vehicle such as traffic and navigation maps, entertainment data such as cable TV, movies, video games, the Internet via web browsers, and cellular telephone data such as text messages. Vehicle data displays can display data generated by vehicle systems and vehicle computing devices and most data available on cable TV, the Internet, home or business computers and video game systems.

DETAILED DESCRIPTION

Figure 1:
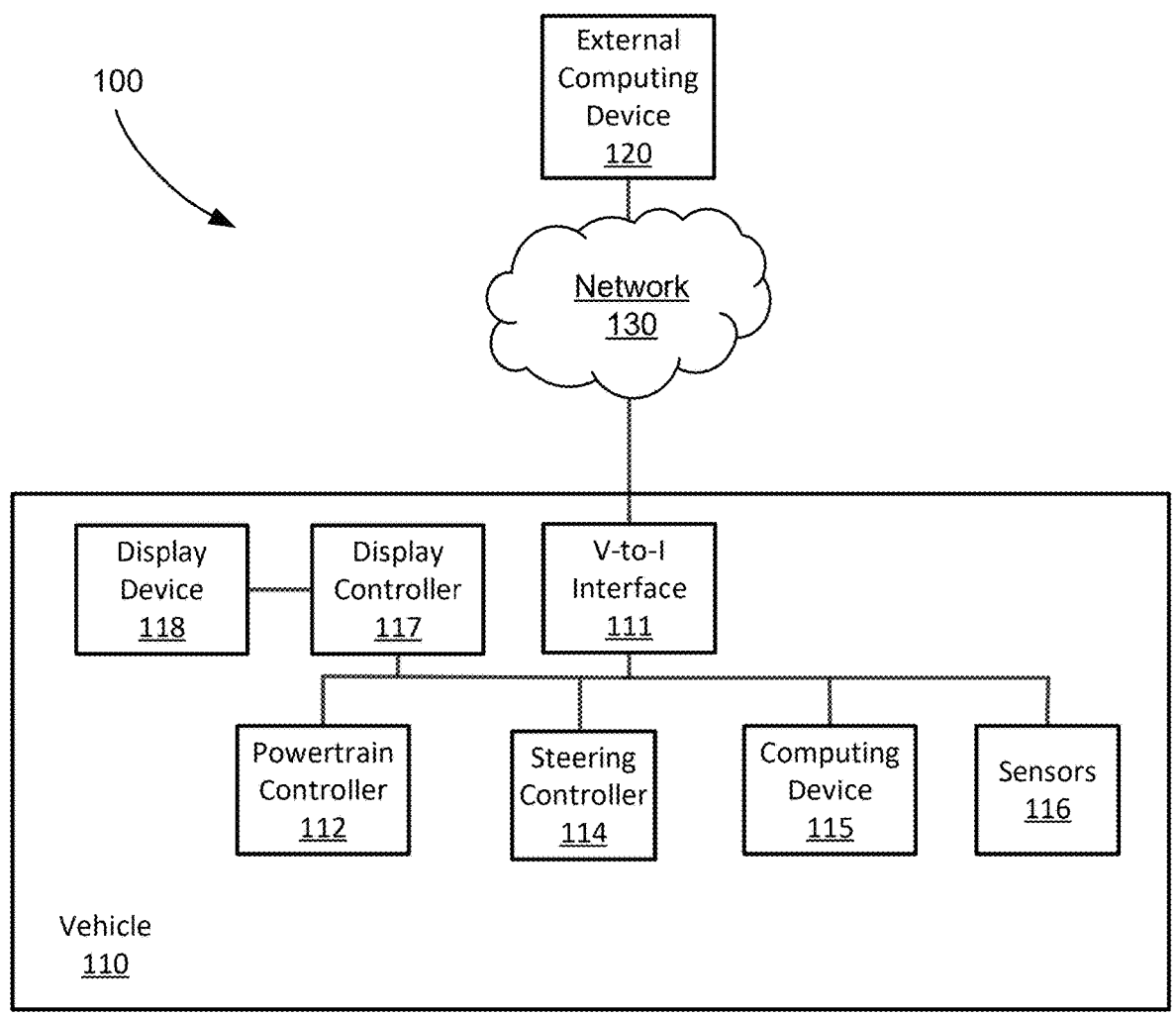
FIG. 1 is a block diagram of an example vehicle system.

A system includes a computer including a processor and a memory, the memory storing instructions executable by the processor to generate a first image at a first viewing angle during a first time by energizing a first LED zone to a first luminance. The instructions further include instructions to generate a second image at a second viewing angle during a second time by energizing a second LED zone to a second luminance. The first luminance is directed at the first viewing angle by a first micro-lens disposed over the first LED zone and a parallax barrier. The second luminance is directed at a second viewing angle by a second micro-lens disposed over the second LED zone and the parallax barrier.

The first viewing angle and the second viewing angle may be respective first and second angles relative to a display substrate formed by the first and second micro-lenses.

Multiple first LED zones may combine to project the first image at the first viewing angle based on multiple first micro-lenses and the parallax barrier when the LEDs of the respective first LED zones are at the first luminance. The first image may be a dynamic image in which the first luminance changes at frame rates greater than a threshold.

Multiple second LED zones may combine to project the second image at the second viewing angle based on multiple second micro-lenses and the parallax barrier when the LEDs of the respective second LED zones are at the second luminance. The second image may be a static image in which the second luminance changes at frame rates less than or equal to a threshold.

At least one of the first micro-lens and the second micro-lens may be offset relative to a plane defined by a display substrate formed by the first and second micro-lenses.

At least one of the first micro-lens and the second micro-lens may be tilted relative to a plane defined by a display substrate formed by the first and second micro-lenses.

The first and second times may be alternating time periods.

The system may include a vehicle dashboard supporting the display device.

The system may include a first occupant area and a second occupant area spaced from the first occupant area. The first viewing angle may be toward the first occupant area and the second viewing angle may be toward the second occupant area.

The system may include a windshield. The first viewing angle may be toward the windshield to be visible as a heads-up display, and the second viewing angle may be angled relative to the windshield to be visible as a direct display.

A method includes generating a first image at a first viewing angle during a first time by energizing a first LED zone to a first luminance. The method further includes generating a second image at a second viewing angle during a second time by energizing a second LED zone to a second luminance. The first luminance is directed at the first viewing angle by a first micro-lens disposed over the first LED zone and a parallax barrier. The second luminance is directed at a second viewing angle by a second micro-lens disposed over the second LED zone and the parallax barrier.

The first viewing angle and the second viewing angle may be respective first and second angles relative to a display substrate formed by the first and second micro-lenses.

Multiple first LED zones may combine to project the first image at the first viewing angle based on multiple first micro-lenses and the parallax barrier when the LEDs of the respective first LED zones are at the first luminance.

Multiple second LED zones may combine to project the second image at the second viewing angle based on multiple second micro-lenses and the parallax barrier when the LEDs of the respective second LED zones are at the second luminance.

An assembly includes a display substrate. The assembly further includes a first LED zone and a second LED zone each including a plurality of LEDs fixed to the display substrate. The first LED zone is energizable to a first luminance during a first time and the second LED zone is energizable to a second luminance during a second time. The assembly further includes a parallax barrier spaced from the display substrate. The assembly further includes a micro-lens array including a first micro-lens disposed over the first LED zone and a second micro-lens disposed over the second LED zone. The first luminance is directed at a first viewing angle by the first micro-lens and the parallax barrier. The second luminance is directed at a second viewing angle by the second micro-lens and the parallax barrier.

The assembly can further include a vehicle dashboard supporting the display substrate, the first and second LED zones, the micro-lens array, and the parallax barrier.

The assembly can further include a first occupant area and a second occupant area spaced from the first occupant area. The first viewing angle may be toward the first occupant area and the second viewing angle may be toward the second occupant area.

The assembly can further include a windshield. The first viewing angle may be toward the windshield to be visible as a heads-up display, and the second viewing angle may be angled relative to the windshield to be visible as a direct display.

Further disclosed herein is a computing device programmed to execute any of the above method steps. Yet further disclosed herein is a computer program product, including a computer readable medium storing instructions executable by a computer processor, to execute an of the above method steps.

Examples of a dual view display are discussed herein wherein the dual view display is implemented in a vehicle. Vehicle data that can be displayed on vehicle display devices include vehicle operating data such as vehicle speed, vehicle energy quantity (e.g., fuel or battery charge remaining) and alert messages regarding vehicle systems (e.g., low tire pressure, engine temperature, etc.). Vehicle display devices can display the status of vehicle components such as climate control and lighting. Coupled with touch screen technology or voice recognition technology, a display device can display data regarding vehicle components and receive input from occupants regarding the control of vehicle components. Vehicle display devices can also be used to display image data from computing device memory or external sources such as the Internet. Examples of image data display include navigation data, videos, and web browsing.

Techniques described herein for dual view displays can enhance vehicle interiors by providing display devices that can display different data depending upon the direction in which the display device is viewed. A single dual view display can be located in a vehicle dashboard in a location that can be viewed by both a vehicle operator and a vehicle passenger. The dual view display can be controlled by programming to permit viewing of selected data based on vehicle occupant area locations. For example, a first occupant, expected to be a vehicle operator based on the location of a first occupant area, can view only a first selection of data on the dual view display while a second occupant, expected to be a passenger based on the location of a second occupant area, can be permitted to view a second selection of data on the same display device at the same time. Because dual view display technology includes self-emissive illumination to a display device based on addressable arrays of light emitting diodes (LEDs), dual view displays can display a full range of data on both displays without interference by alternating displays at high frame rates. This permits two different types of data to be visible by two different users from a single display device that occupies only a single display size and location which can double the efficiency of display devices in a vehicle interior.

FIG. 1 is a diagram of vehicle system 100. Vehicle system 100 includes a vehicle 110. The vehicle 110 is generally a land-based vehicle 110 having three or more wheels (i.e., a passenger car, light truck, etc.). Vehicle 110 includes one or more sensors 116, a V2I interface 111, a computing device 115, one or more controllers 112, 114, 117 and a display device 118. One or more vehicle computing devices 115 can receive data regarding the operation of the vehicle 110 from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle propulsion (e.g., by controlling one or more of an internal combustion engine, electric motor, hybrid engine, etc.), steering, climate control, interior and exterior lights, etc., as well as to determine whether and when the computing device 115, as opposed to a human operator, is to control such operations. The computing device 115 can also control the temporal alignment of lighting to sensor acquisition to account for the color effects of vehicle lights or external lights.

The computing device 115 may include or be communicatively coupled to (i.e., via a vehicle communications bus as described further below) more than one computing device (i.e., controllers or the like included in the vehicle 110 for monitoring and controlling various vehicle components (i.e., a propulsion controller 112, a steering controller 114, display controller 117 etc.)). The computing device 115 is generally arranged for communications on a vehicle communication network (i.e., including a bus in the vehicle 110 such as a controller area network (CAN) or the like); the vehicle 110 network can additionally or alternatively include wired or wireless communication mechanisms such as are known (i.e., Ethernet or other communication protocols).

Via the vehicle network, the computing device 115 may transmit messages to various devices in vehicle 110 and receive messages from the various devices (i.e., controllers, actuators, etc.) including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network. In addition, the computing device 115 may be configured for communicating through the vehicle-to-infrastructure (V2I) interface 111 with an external computing device 120 (i.e., a cloud server) via a network 130, which, as described below, includes hardware, firmware, and software that permits computing device 115 to communicate with an external computing device 120, which can include the Internet via a network 130 such as wireless Internet (WI-FI®) or cellular networks. V2X interface 111 may accordingly include processors, memory, transceivers, etc., configured to utilize various wired and wireless networking technologies (i.e., cellular, BLUETOOTH®, Bluetooth Low Energy (BLE), Ultra-Wideband (UWB), Peer-to-Peer communication, UWB based Radar, IEEE 802.11, and other wired and wireless packet networks or technologies). The computing device 115 also includes nonvolatile memory such as is known.

As already mentioned, generally included in instructions stored in the memory and executable by the processor of the computing device 115 is programming for operating one or more vehicle 110 components (i.e., steering, propulsion, etc.) without intervention of a human operator. Using data received in the computing device 115 (i.e., the sensor data from the sensors 116, an external computing device 120, etc.), the computing device 115 may make various determinations and control various vehicle 110 components and operations. For example, the computing device 115 may include programming to control vehicle 110 operational behaviors (i.e., physical manifestations of vehicle 110 operation such as speed, steering, etc.) as well as tactical behaviors (i.e., control of operational behaviors typically in a manner intended to achieve efficient traversal of a route such as a distance between vehicles and amount of time between vehicles, lane-change, minimum gap between vehicles, left-turn-across-path minimum, time-to-arrival at a particular location and intersection (without signal) minimum time-to-arrival to cross the intersection).

Controllers, as that term is used herein, include computing devices that typically are programmed to monitor and control a specific vehicle subsystem. Examples include a propulsion controller 112, a steering controller 114 and a display controller 117. A controller may be an electronic control unit (ECU) such as is known, possibly including additional programming as described herein. The controllers may communicatively be connected to and receive instructions from the computing device 115 to actuate the subsystem according to the instructions. For example, the steering controller 114 may receive instructions from another ECU included in vehicle 110 (e.g., the computing device 115) to operate the steering of the vehicle 110.

The one or more controllers 112, 114, 117 for the vehicle 110 may include known electronic control units (ECUs) or the like including, as non-limiting examples, one or more propulsion controllers 112, one or more steering controllers 114 and one or more display controllers. Each of the controllers 112, 114, 117 may include respective processors and memories and one or more actuators. The controllers 112, 114, 117 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices such as are known to provide data via the vehicle communications bus. Sensors 116 may collect data related to the vehicle 110 and the environment in which the vehicle 110 is operating. By way of example, and not limitation, sensors 116 may include altimeters, cameras, LIDAR, radar, ultrasonic sensors, infrared sensors, pressure sensors, accelerometers, gyroscopes, temperature sensors, hall sensors, optical sensors, voltage sensors, current sensors, mechanical sensors such as switches, etc. The sensors 116 may be used to sense the environment in which the vehicle 110 is operating (i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110). The sensors 116 may further be used to collect data including dynamic vehicle 110 data related to operations of the vehicle 110 such as velocity, yaw rate, steering angle, engine speed, oil pressure, power applied to controllers 112, 114, 117 in the vehicle 110, connectivity between components, and accurate and timely performance of components of the vehicle 110.

Display device 118 displays two-dimensional visual data to occupants of the vehicle 110. Display device 118 can display visual data in monochrome or color and the visual data can be updated at a frame rate, which can be 60 frames per second, for example. Displayed visual data can be a static image, where the majority of the two-dimensional area does not change from frame to frame, or a dynamic image, where the majority of the two-dimensional area changes from frame to frame. Visual data to be displayed on display device 118 can be generated by display controller 117. Display controller 117 is a computing device such as an ECU or the like that can receive data to be displayed on display device 118 in a visual format from computing device 115, other vehicle ECUs, or from an external computing device 120 via network 130.

Figure 2:
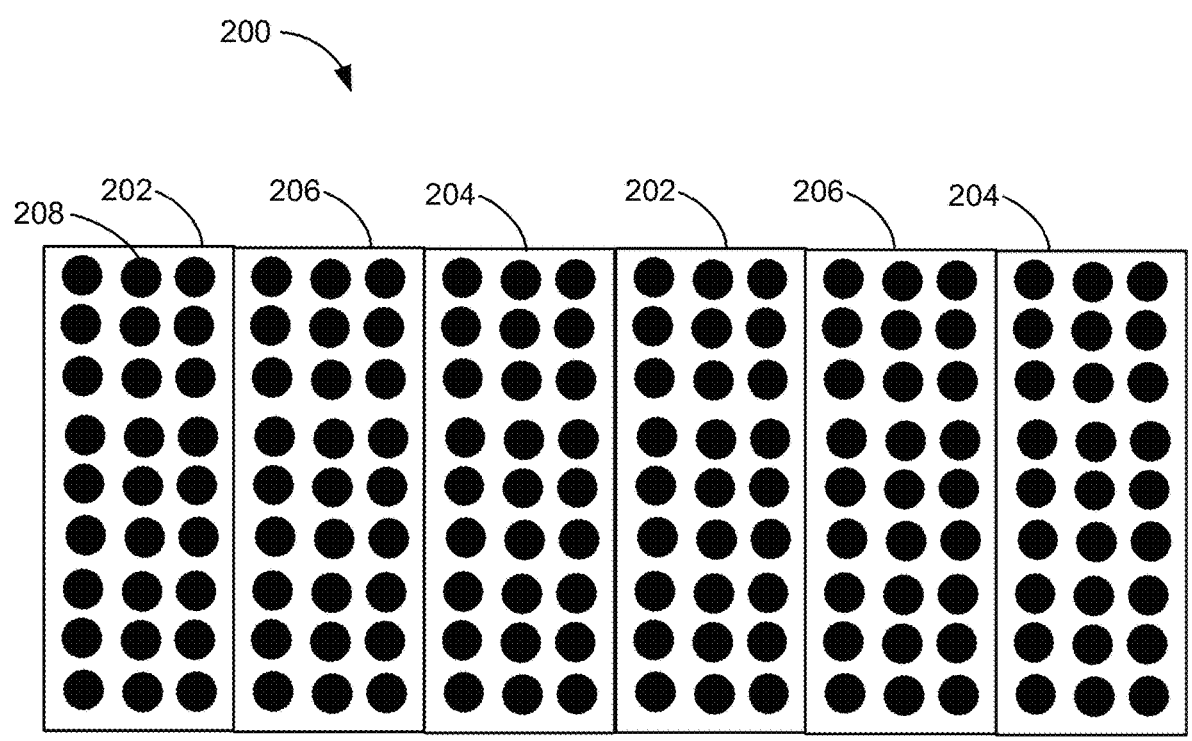
FIG. 2 is a diagram of an example vehicle display.

Techniques discussed herein for dual view displays provide an addressable LED array to illuminate a micro-lens from beneath a micro-lens array. This technique supplies uniform light to illuminate the entire micro-lens. As illustrated in FIG. 2, an addressable LED array includes one or more LEDs in addressable zones, meaning that the LEDs in each zone can be controlled separately. Each LED zone can include multiple LEDs, for example red, green and blue, which can be controlled separately to yield any color including white light at any intensity from off (black) to the maximum intensity of the LEDs. This permits the LED to illuminate a micro-lens to project two different displayed images based on two different types of data simultaneously. A type of data is data generated from a common or same source (e.g., sensors 116, an external computing device, a web browser, etc.)

FIG. 2 is a diagram of an example LED self-emissive display 200. LED self-emissive display 200 includes an array of LEDs 208 arranged in LED zones 202, 204, 206. The LEDs 208 in the array may have a same or different diameter as each other. The LEDs 208 may be micro-LEDs (i.e., an LED with a diameter that is less than one hundred micrometers). Each LED zone 202, 204, 206 can include one or more LEDs 208. For example, LED zones 202, 204, 206 can include red, green, and blue LEDs 208 that combine to create color, including white light. LEDs 208 in LED zones 202, 204, 206 can be controlled separately to generate self-emissive patterns to support a dual view display. As described below in relation to FIGS. 3A-3C, LEDs 208 in LED zones 202, 204, 206 can be energized to different quantities or amounts of luminance and different colors to generate dual view display data at different viewing angles.

Figure 3A:
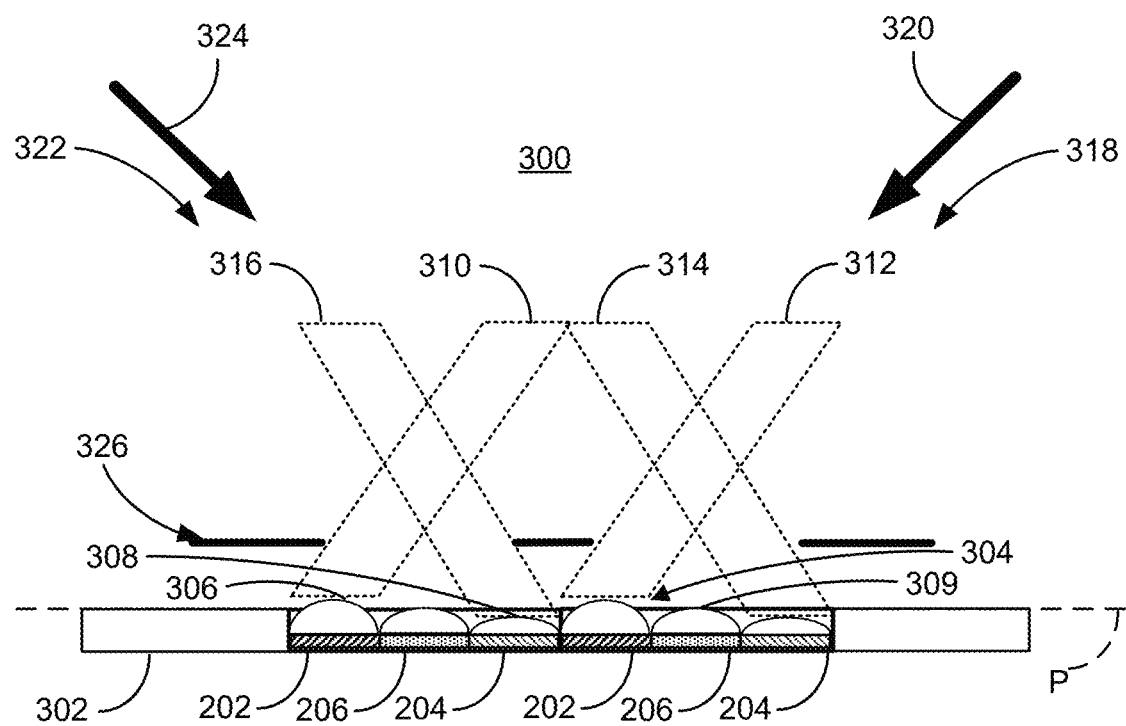
FIGS. 3A-3C are diagrams of an example micro-lens arrays disposed over an example light emitting diode (LED) array.
Figure 3B:
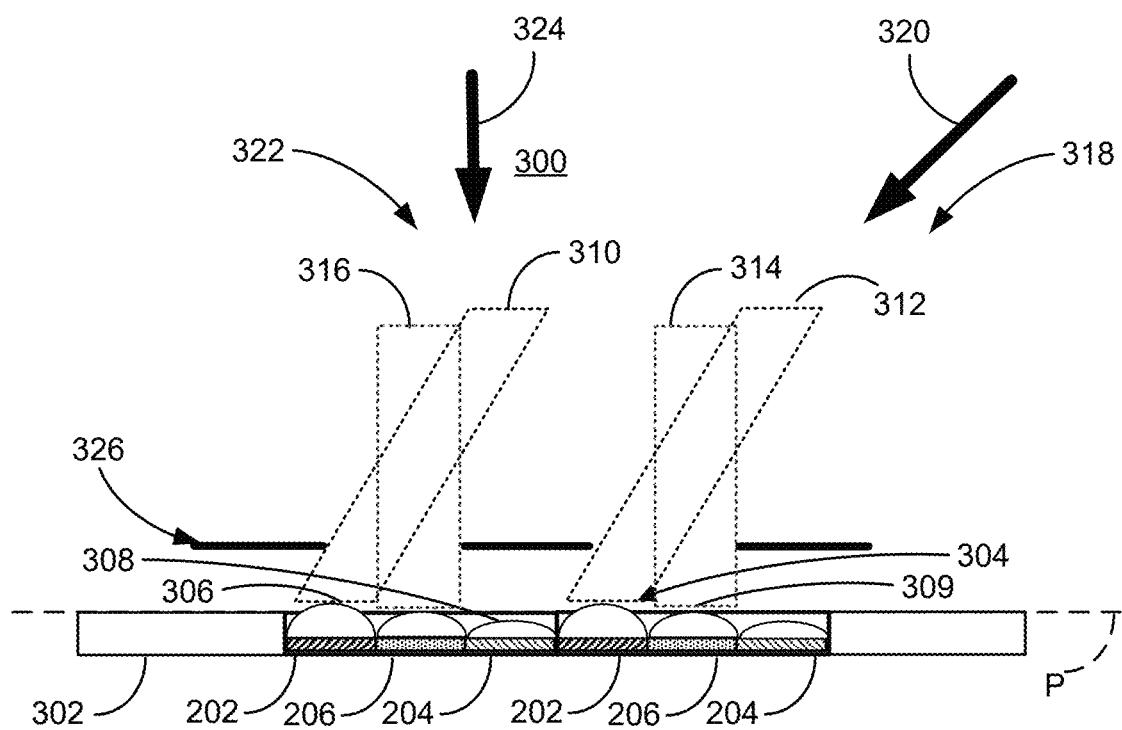
Figure 3C:
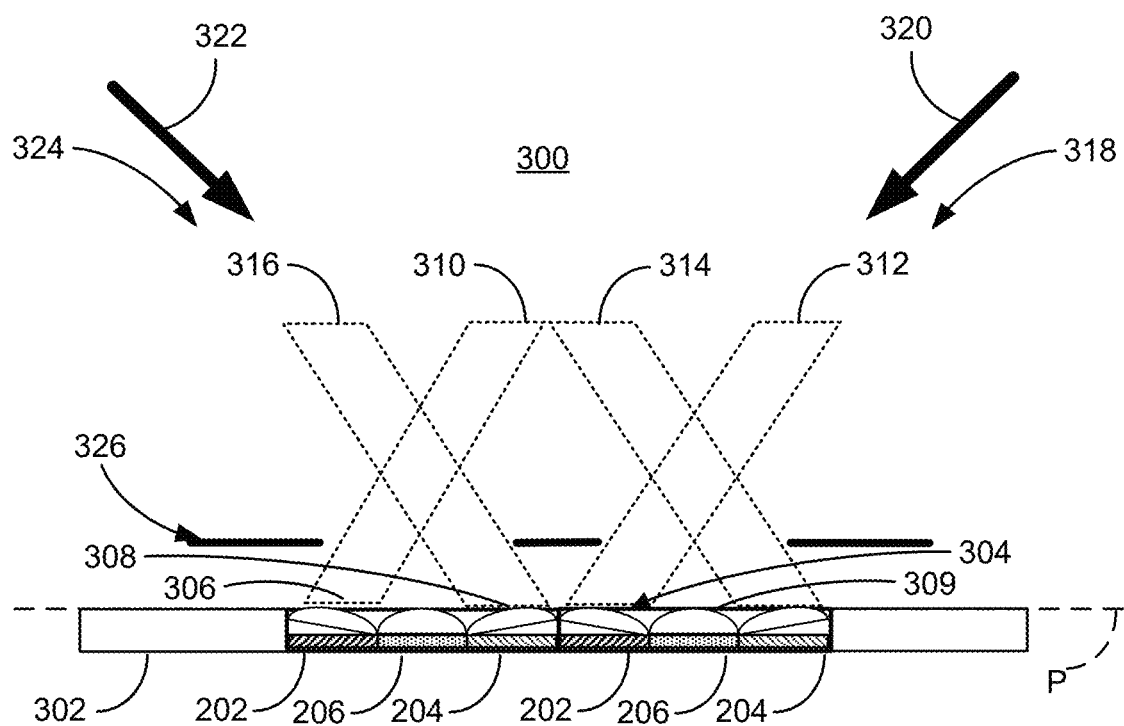

FIGS. 3A-3C are diagrams of an example cross-sectional view of a display 300. Display 300 is a display device 118 that includes display substrate 302 that includes LED self-emissive display 200 and micro-lens array 304 disposed, at least partially, in a plane P defined by display substrate 302. The micro-lens array 304 includes a plurality of micro-lenses 306, 308, 309. A micro-lens is a lens with a diameter that is less than one millimeter. Each LED zone 202, 204, 206 can include red, green, and blue LEDs. LEDs 208 included in LED zones 202, 204, 206 emit different quantities or amounts of luminance (e.g., light) and different colors in response to being energized by differing voltages applied to the LEDs 208 in LED zones 202, 204, 206 by display controller 117 to provide illumination for micro-lenses 306, 308, 309 in the micro-lens array 304.

Each micro lens 306, 308, 309 is disposed over one respective LED zone 202, 204, 206. Each micro-lens 306, 308, 309 transmits luminance and color emitted from the respective LED zones 202, 204, 206 disposed below the respective micro-lens 306, 308, 309. For example, the micro-lens array 304 may include a first micro-lens 306 disposed over a first LED zone 202, a second micro-lens 308 disposed over a second LED zone 204, and a third micro-lens 309 disposed over a third LED zone 206. As an example, the first micro-lens 306 and the second micro-lens 308 may be arranged to direct luminance (and color) obliquely (i.e., neither parallel nor perpendicular) relative to the plane P. Further, the third micro-lens 309 may be arranged to direct luminance (and color) normal (i.e., perpendicular) to the plane P.

One exemplary micro-lens array 304 is constructed as illustrated in FIGS. 3A-3B. In such an example, the micro-lenses 306, 308, 309 are offset relative to each other. For example, the third micro-lens 309 may be disposed in the plane P. The first micro-lens 306 and the second micro-lens 308 may be offset relative to the plane P. For example, the first micro-lens 306 may be disposed above the plane P, and the second micro-lens 308 may be disposed below the plane P. That is, the second micro-lens 308 may be disposed between the LEDs 208 and the plane P, and the plane P may be disposed between the LEDs 208 and the first micro-lens 306.

Another exemplary micro-lens array 304 is constructed as illustrated in FIG. 3C. In such an example, the first and second micro-lenses 306, 308 may be tilted relative to the plane P. That is, lens planes (i.e., a plane extending through a lens and defined normal to an optical axis (i.e., an imaginary straight line that passes through a geometrical center of the lens and through respective centers of curvatures of the lens respective surfaces) of the lens) of each of the first and second micro-lenses 306, 308 may be rotated relative to the plane P, such that the lens planes of each of the first and second micro-lenses 306, 308 are oblique relative to the plane P. The third micro-lens 309 may be aligned with the plane P (i.e., a lens plane of the third micro-lens 309 extend parallel to the plane P).

Content presented via display 300 can be generated by combining first display data 310, 312 to form a first image 318 at a first viewing angle 320 during a first time, and second display data 314, 316 can combine form a second image 322 at a second viewing angle 324 during a second time. In the example micro-lens arrays 304 shown in FIGS. 3A-3C, the first image 318 is formed via first display data 310, 312 transmitted through one or more first micro-lenses 306 disposed over one or more respective first LED zones 202. To form first image 318 at first viewing angle 320, first LED zones 202 can be energized at a first voltage to generate a first luminance and a first color. During the first time, while first LED zones 202 are energized at the first voltage, the first luminance and first color are transmitted from first LED zones 202 as first display data 310, 312 through the first micro-lenses 306 and a parallax barrier 326 to form first image 318 at first viewing angle 320. During the first time, second LED zones 204 (and third LED zones 206) can be de-energized (i.e., lack a voltage) so that no light is emitted through the second micro-lenses 308 (and the third micro-lenses 309) and the parallax barrier 326, and no second image 322 is formed by second display data 314, 316 at a second viewing angle 324.

In the example micro-lens arrays 304 shown in FIGS. 3A and 3C, the second image 322 is formed via display data 314, 316 transmitted through the second micro-lenses 308. To form second image 322 at second viewing angle 324 during the second time, second LED zones 204 can be energized at a second voltage to generate a second luminance and a second color. During the second time, while second LED zones 204 are energized at the second voltage, the second luminance and the second color are transmitted from the second LED zones 204 through the second micro-lenses 308 and the parallax barrier 326 as second display data 314, 316 to form second image 322 at second viewing angle 324. During second time, first LED zones 202 (and third LED zones 206) can be de-energized so that no light is emitted through the first micro-lenses 306 (and the third micro-lenses 309) and the parallax barrier 326 and no first image 318 is formed by first display data 310, 312 at the first viewing angle 320. In the example micro-lens array 304 shown in FIG. 3B, the second image 322 is formed via display data 314, 316 transmitted through the third micro-lens 309 (e.g., in the same manner as discussed immediately above).

The first and second times can be alternating time periods (e.g., at 60 Hz or greater) to permit a human (e.g., due to visual persistence, i.e., perception of an image even after it is no longer displayed) to perceive the first image 318 and the second image 322 as continuous despite switching LED zones 202, 204 on and off at alternate time periods 60 or more times per second. Changing the location of the parallax barrier 326 with respect to the display substrate 302 can change the first viewing angle 320 and the second viewing angle 324. For example, as shown in FIG. 3B, the second viewing angle 324 can be made perpendicular to the display substrate 302 while the first viewing angle 320 can remain at an oblique angle to the display substrate 302 by moving the parallax barrier 326 further away from the display substrate 302. As another example, as shown in FIGS. 3A and 3C, the second viewing angle 324 and the first viewing angle 320 can be made at an oblique angle to the display substrate 302.

A display 300 can include multiple LED zones 202, 204, 206 and the micro-lens array 304. The multiple LED zones 202, 204, 206 and micro-lens array 304 can be arranged in a two-dimensional pattern in the display substrate 302 as columns or staggered rectangular array, for example, as long as the angular relationship between openings in the parallax barrier 326 and micro-lenses 306, 308, 309 are maintained to provide first and second viewing angles 320, 324. Changing LED zone 202, 204, 206 luminance at two time periods as described above can permit a single display device 118 to perform as a display 300 while minimizing computational resources required in display controller 117 to generate first and second images 318, 322 at first and second viewing angles 320, 324.

Figure 4:
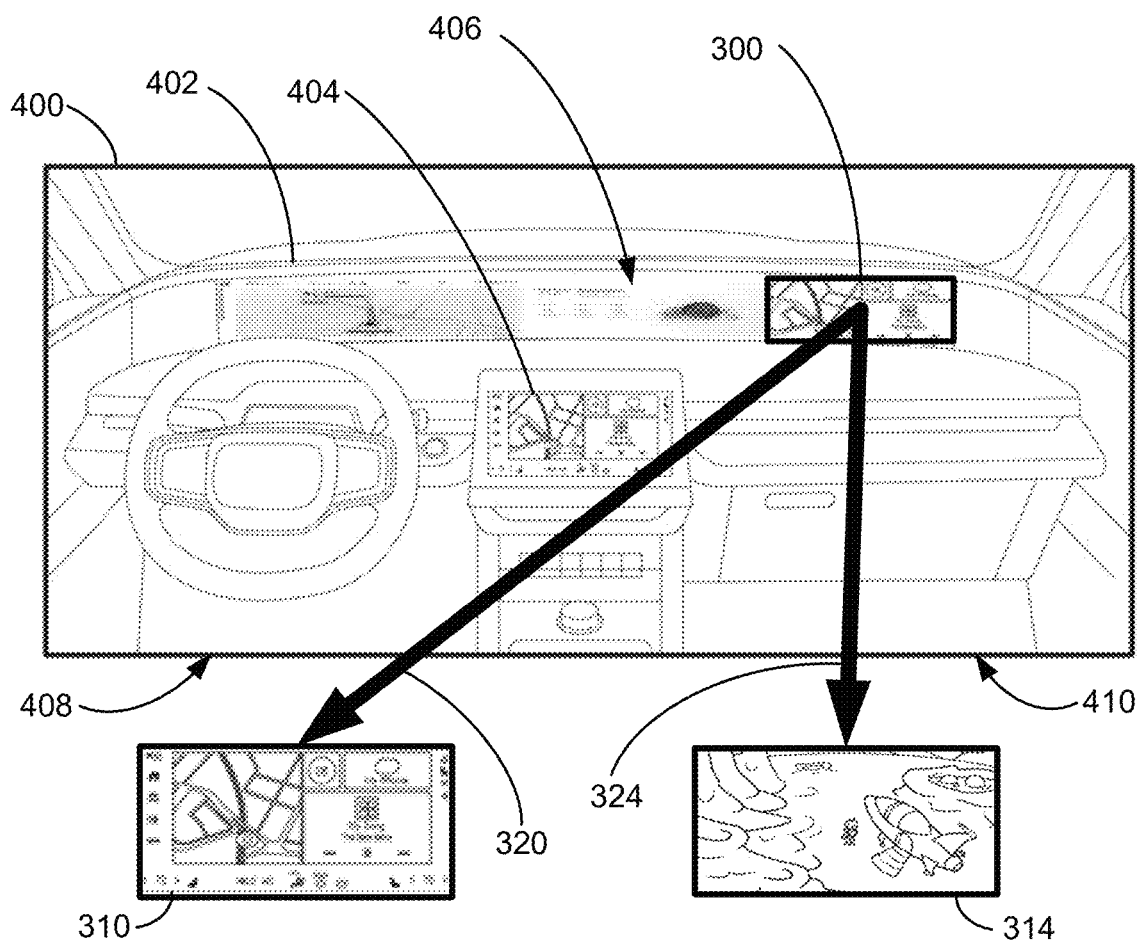
FIG. 4 is a diagram of an example vehicle interior including a dual view display.

FIG. 4 is a diagram of an example display 300 included in a view of a portion of a vehicle 110 interior 400. The vehicle interior 400 is a forward-facing view that illustrates a vehicle dashboard 402. The dashboard 402 includes a conventional display 404 that is visible from a range of angles that includes occupants in multiple locations in vehicle 110, namely both an operator and a passenger. Dashboard 402 also includes a panoramic display 406 that extends from the left side of dashboard 402 directly in front of an operator to the right side of the dashboard 402 directly in front of a passenger. The panoramic display 406 can be divided into multiple display areas, including a display 300, that can each display multiple types of data. The display 300 can be arranged to display first display data 310 visible at a first viewing angle 320 (e.g., toward a first occupant area 408 associated with an operator of the vehicle 110) and second display data 314 visible at a second viewing angle 324 (e.g., toward a second occupant area 410 associated with a passenger of the vehicle 110). The first viewing angle 320 may not permit the second display data 314 to be viewed from the first occupant area 408 (i.e., by the operator), and the second viewing angle 324 may not permit the first display data 310 to be viewed from the second occupant area 410 (i.e., by the passenger).

First display data 310 can include display data that is relevant to an operator of a vehicle 110, for example navigation data or vehicle status data. Second display data 314 can include display data that can be considered not relevant to an operator, but relevant to a passenger, for example a movie or a web browser. Dual view display techniques described herein can enhance vehicle 110 displays by displaying data that is appropriate to or intended for different occupants while the respective data is provided via a shared display area. Display data can be a static image, where changes to the luminance of the LED zones 202, 204, 206 occur at frame rates less than a threshold and generally do not change more than a small percentage of the display area. For example, a static image might be data included in a climate control panel display, where the changes only occur in response to occupant input or changes in vehicle interior temperature. Display data can be a dynamic image, where changes to luminance of the LED zones 202, 204, 206 can occur at frame rates greater than the threshold and change large percentages of the display area. Examples of a dynamic image include video content and web browsers. The threshold may be specified as a video frame rate (i.e., 60 frames per second).

Figure 5:
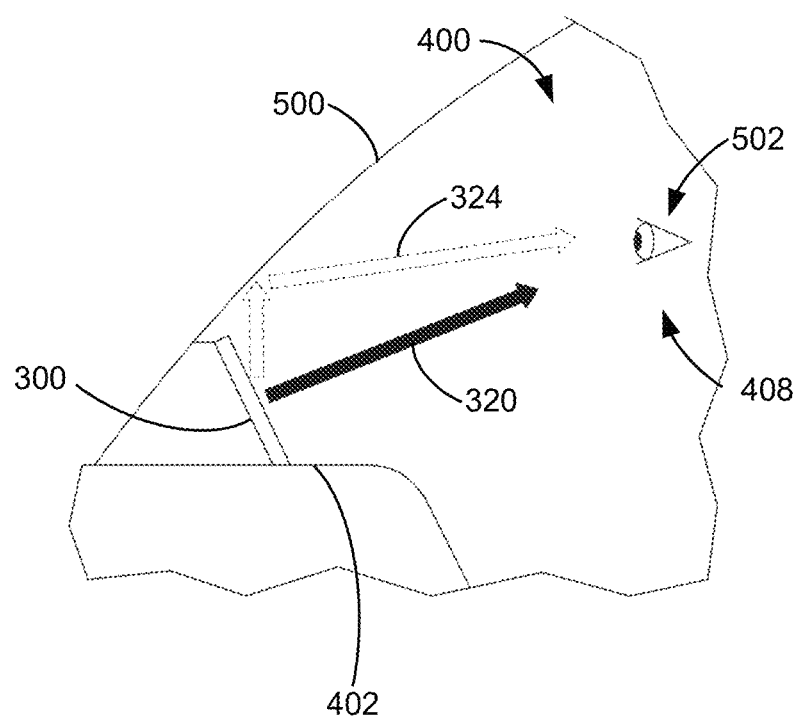
FIG. 5 is a diagram of an example dual view display.

FIG. 5 is a diagram of a second example of a dual view display 300 included in a portion of a vehicle 110 interior 400. FIG. 5 includes a side view of a vehicle 110 interior 400, illustrating a dashboard 402 and a windshield 500. Display 300 emits first display data at a first viewing angle 320 viewable by an occupant 502 (e.g., in a first occupant area 408). Display 300 emits second display data viewable at a second viewing angle 324 towards the occupant 502 by reflecting the second display data off the windshield 500. That is, the first viewing angle 320 and the second viewing angle 324 are respective first and second angles relative to the display substrate 302. Reflecting the second display data off the windshield 500 forms a heads-up display (HUD), which creates a virtual image that makes the second display data appear to hover in mid-air in front of the windshield 500. A HUD permits an occupant 502 of a vehicle 110 to view the second display data without moving his or her eyes from the field of view in front of the vehicle 110.

Luminance requirements for direct display can differ from luminance requirements for a HUD. For example, the luminance requirements for a HUD may be greater than luminance requirements for direct display (e.g., to offset or counter sunlight being transmitted through the windshield 500). A luminance requirement specifies a display luminance required for display data to be perceived at the respective viewing angle. As one example, luminance requirements for display data viewed at first viewing angle 320 may specify a display luminance of 1000 to 3000 Nits. A Nit is a unit of measurement used to measure brightness of electronic displays and is measured in candelas per square meter, where a candela is the luminous power per unit solid angle weighted by a luminous intensity function of the human eye. As another example, luminance requirements for a HUD, for example display data viewed at second viewing angle 324, may specify a display luminance of 7000 to 10,000 Nits. Techniques included in a dual view display as described herein can provide the two different luminous intensities required for direct displays and HUDs respectively.

Figure 6:
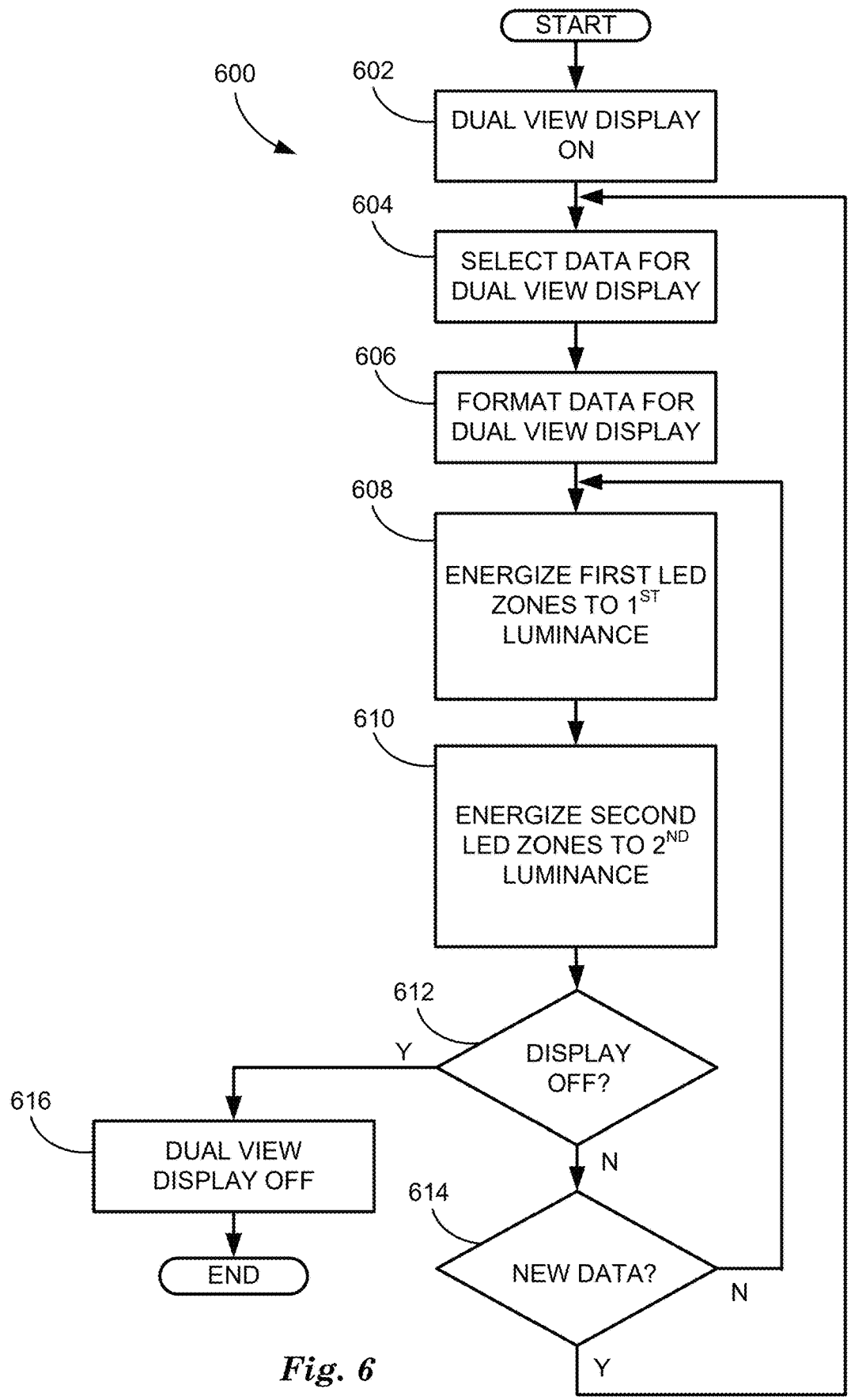
FIG. 6 flowchart diagram of an example process to display data on a dual view display.

FIG. 6 is a flowchart diagram of a process 600 for displaying two or more images at two viewing angles 320, 324 from one dual view display 300. Process 600 can be implemented as software executing on a computing device 115 and hardware including a dual view display 300 as described herein. Process 600 includes multiple blocks that can be executed in the illustrated order. Process 600 could alternatively or additionally include fewer blocks and can include the blocks executed in different orders.

Process 600 begins in block 602, where a display controller 117 is commanded to turn on a dual view display 300. The command to turn on the dual view display 300 can be part of an initialization process that is started whenever computing device 115 senses an occupant entering the vehicle or the dual view display 300 can be commanded to turn on by an event such as an occupant request. For example, the display 300 can be used in the vehicle 110 for various kinds of content or data, as mentioned above. For example, content based on data received from vehicle sensors 116 could be displayed (e.g., relating to an external or internal temperature, vehicle speed, a status of various vehicle 110 systems, etc.). Yet further alternatively or additionally, the display 300 could provide entertainment content (e.g., video entertainment or web browsing for an occupant).

At block 604 the display controller 117 determines two types of display data to display on the display 300. Computing device 115 or display controller 117 can store lists of types of display data that are permissible for respective portions of the dual view display 300. Default display data can be selected initially and later overridden by occupant selection (e.g., providing user input to select content) or change in vehicle status (e.g., a speed, a planned path, a gear selection, etc.), for example, based on the permissible types of display data.

At block 606 the display controller 117 can format display data for the two different types (e.g., a first type could be vehicle 110 data such as speed, temperature, etc., and a second type could be entertainment data such as a video presentation, content from a web browser, etc.) of display data to display to occupants of a vehicle 110 in two different occupant areas 408, 410 using a single dual view display 300. The dual view display 300 can also display two different displays to a single occupant of a vehicle 110 where a first display is a direct display and a second display is a heads-up display, for example. First display data 310, 312 can be formatted as first image 318 data to be displayed by first LED zones 202 through first micro-lenses 306 and second display data 314, 316 can be formatted as second image 322 to be displayed by second LED zones 204 through second (or third) micro-lenses 308 (or 309) at alternating time intervals of a frame time.

At block 608 display controller 117 can energize one or more LEDs 208 included in first LED zones 202 at a first luminance. First LED zones 202 can include red, green, and blue LEDs 208, for example, and the command to energize the LEDs 208 can include commands to energize the LEDs 208 to generate a first color. Display controller 117 can energize first LED zones 202 disposed below the first micro-lenses 306 such that the first luminance and the first color are transmitted through the first micro-lenses 306 which, in cooperation with parallax barrier 326, generates a first image 318 from display data 310, 312 to be viewed at a first viewing angle 320 during a first time included in a frame time. During the first time, display controller 117 can de-energize (i.e., provide no voltage to) second (and third) LED zones 204 (and 206) to prevent second display data 314, 316 from being displayed as a second image 322 at a second viewing angle 324.

At block 610 display controller 117 can energize one or more LEDs 208 included in second (or third) LED zones 204 (or 206) to a second luminance. Second (or third) LED zones 204 (or 206) can include red, green, and blue LEDs 208, for example, and the commands to energize the LEDs 208 can include commands to energize the LEDs 208 to generate a second color. Display controller 117 can energize second (or third) LED zones 204 (or 206) disposed below the second (or third) micro-lenses 308 (or 309) such that the second luminance and the second color are transmitted through the second (or third) micro-lenses 308 (or 309) which, in cooperation with parallax barrier 326 generates a second image 322 formed by second display data 314, 316 to be viewed at a second viewing angle 324 during a second time included in a frame time. During the second time, display controller 117 can de-energize first LED zones 202 to prevent first display data 310, 312 from being displayed as a first image 318 at a first viewing angle 320. Display 300 can provide dual views as described herein by display controller 117 alternately displaying first display data 310, 312 as a first image 318 at first viewing angle 320 at a first time and second display data 314, 316 as a second image 322 at second viewing angle 324 at a second time by energizing LED zones 202, 204, 206 as described in blocks 608 and 610.

At block 612 display controller 117 determines if the display 300 is to be turned off. Display 300 can be turned off at a time the vehicle 110 is stopped and occupants exit the vehicle or by command from an occupant, for example. If the display 300 is to keep running, process 600 passes to block 614. If the dual view display 300 is to be turned off, process 600 branches to block 616.

At block 614 display controller 117 determines whether the display 300 has new display data for either of the two display views included in the display 300. Display 300 can operate on a fixed frame time, for example 60 frames per second, meaning that blocks 608, 610 can be executed to display first image 318 and second image 322 in one frame time. At the end of the frame time, display controller 117 determines whether the same display data that was formatted to be displayed by the display 300 in the current frame time is to be displayed again in the next frame time. If the data included in both first image 318 and second image 322 is unchanged (e.g., a static image) process 600 returns to block 608 to display the same display data in the next frame time. In examples where either first image 318 or second image 322 has changed (e.g., either first image 318 or second image 322 is a dynamic image which can change at each frame), process 600 returns to block 604 to permit display controller 117 to select and format new display data for either one or both first image 318 and second image 322.

At block 616 computing device 115 can turn the display 300 off. This could be based on a command received from an occupant of vehicle 110 or in response to computing device 115 determining that the vehicle 110 is stopped and the occupants have exited the vehicle 110. Following block 616 process 600 ends.

Any action taken by a vehicle or user of the vehicle, including with respect to subject matter herein, should always be in accord with applicable guidance or instructions from a vehicle manufacturer and applicable laws or rules.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and technologies, including, without limitation, and either alone or in combination, Java™, C, C++, Python, Julia, SCALA, Visual Basic, Java Script, Perl, HTML, etc. In general, a processor (i.e., a microprocessor) receives commands (i.e., from a memory, a computer-readable medium, etc.) and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example (i.e., a candidate to an "exemplary widget" should be read as simply referring to an example of a widget).

In the drawings, the same reference numbers indicate the same elements. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claimed invention.

The invention claimed is:

1. A system comprising:
a computer, including a processor and a memory storing instructions executable by the processor to:
generate a first image at a first viewing angle during a first time by energizing a first LED zone to a first luminance; and
generate a second image at a second viewing angle during a second time by energizing a second LED zone to a second luminance;
wherein the first LED zone and the second LED zone are arranged in columns or a staggered rectangular array, and wherein the first luminance is directed at the first viewing angle by a first micro-lens disposed over the first LED zone and a parallax barrier, and the second luminance is directed at a second viewing angle by a second micro-lens disposed over the second LED zone and the parallax barrier which displays two different types of data to two different users from a single display device and wherein the first micro-lens is disposed above a plane defined by a display substrate that includes the first LED zone and the second LED zone and the second micro-lens is disposed below the plane.

2. The system of claim 1, wherein the first viewing angle and the second viewing angle are respective first and second angles relative to a display substrate formed by the first and second micro-lenses.

3. The system of claim 1, wherein multiple first LED zones combine to project the first image at the first viewing angle based on multiple first micro-lenses and the parallax barrier when the respective first LED zones are at the first luminance.

4. The system of claim 3, wherein the first image is a dynamic image in which the first luminance changes at frame rates greater than a threshold.

5. The system of claim 1, wherein multiple second LED zones combine to project the second image at the second viewing angle based on multiple second micro-lenses and the parallax barrier when the respective second LED zones are at the second luminance.

6. The system of claim 5, wherein the second image is a static image in which the second luminance changes at frame rates less than or equal to a threshold.

7. The system of claim 1, wherein at least one of the first micro-lens and the second micro-lens is offset relative to a plane defined by a display substrate formed by the first and second micro-lenses.

8. The system of claim 1, wherein at least one of the first micro-lens and the second micro-lens is tilted relative to a plane defined by a display substrate formed by the first and second micro-lenses.

9. The system of claim 1, wherein the first and second times are alternating time periods.

10. The system of claim 1, further comprising a vehicle dashboard supporting a display device including the first and second LED zones.

11. The system of claim 1, further comprising a first occupant area and a second occupant area spaced from the first occupant area, the first viewing angle being toward the first occupant area and the second viewing angle being toward the second occupant area.

12. The system of claim 1, further comprising a windshield, the first viewing angle being toward the windshield to be visible as a heads-up display and the second viewing angle being angled relative to the windshield to be visible as a direct display.

13. A method comprising:
generating a first image at a first viewing angle during a first time by energizing a first LED zone to a first luminance; and
generating a second image at a second viewing angle during a second time by energizing a second LED zone to a second luminance;
wherein the first LED zone and the second LED zone are arranged in columns or a staggered rectangular array, and wherein the first luminance is directed at the first viewing angle by a first micro-lens disposed over the first LED zone and a parallax barrier, and the second luminance is directed at a second viewing angle by a second micro-lens disposed over the second LED zone and the parallax barrier which displays two different types of data to two different users from a single display device and wherein the first micro-lens is disposed above a plane defined by a display substrate that includes the first LED zone and the second LED zone and the second micro-lens is disposed below the plane.

14. The method of claim 13, wherein the first viewing angle and the second viewing angle are respective first and second angles relative to a display substrate formed by the first and second micro-lenses.

15. The method of claim 13, wherein multiple first LED zones combine to project the first image at the first viewing angle based on multiple first micro-lenses and the parallax barrier when the respective first LED zones are at the first luminance.

16. The method of claim 13, wherein multiple second LED zones combine to project the second image at the second viewing angle based on multiple second micro-lenses and the parallax barrier when the respective second LED zones are at the second luminance.

17. An assembly comprising:
a display substrate;
a first LED zone and a second LED zone each including a plurality of LEDs fixed to the display substrate;
the first LED zone being energizable to a first luminance during a first time and the second LED zone being energizable to a second luminance during a second time;
a parallax barrier spaced from the display substrate; and
wherein the first LED zone and the second LED zone are arranged in columns or a staggered rectangular array, and a micro-lens array including a first micro-lens disposed over the first LED zone and a second micro-lens disposed over the second LED zone, wherein the first luminance is directed at a first viewing angle by the first micro-lens and the parallax barrier, and the second luminance is directed at a second viewing angle by the second micro-lens and the parallax barrier which displays two different types of data to two different users from a single display device and wherein the first micro-lens is disposed above a plane defined by a display substrate that includes the first LED zone and the second LED zone and the second micro-lens is disposed below the plane.

18. The assembly of claim 17, further comprising a vehicle dashboard supporting the display substrate, the first and second LED zones, the micro-lens array, and the parallax barrier.

19. The assembly of claim 17, further comprising a first occupant area and a second occupant area spaced from the first occupant area, the first viewing angle being toward the first occupant area and the second viewing angle being toward the second occupant area.

20. The assembly of claim 17, further comprising a windshield, the first viewing angle being toward the windshield to be visible as a heads-up display and the second viewing angle being angled relative to the windshield to be visible as a direct display.

* * * * *